United States Patent [19]

Lee

[11] 4,039,331

[45] Aug. 2, 1977

[54] CARRIER BEAD COATING COMPOSITIONS

[75] Inventor: Lieng-Huang Lee, Webster, N.Y.

[73] Assignee: Xerox Corporation, Stamford, Conn.

[21] Appl. No.: 669,773

[22] Filed: Mar. 24, 1976

[51] Int. Cl.[2] .......................... G03G 9/10; B32B 9/04

[52] U.S. Cl. .............................. 96/1 SD; 252/62.1 P; 427/19; 428/405; 428/406; 428/407; 526/265; 526/279

[58] Field of Search ............... 427/215, 216, 219, 220, 427/221, 14, 19; 252/62.1; 428/403, 405, 406, 407, 404; 96/15 D; 260/824 R, 42.15, 42.16; 526/265, 279

[56] References Cited

U.S. PATENT DOCUMENTS 3,466,270 9/1969 Cook .................................. 526/265

3,526,533 9/1970 Jacknow et al. ................ 252/62.1 P

FOREIGN PATENT DOCUMENTS 2,443,059 3/1975 Germany ........................ 252/62.1 P

*Primary Examiner*—Ronald H. Smith
*Assistant Examiner*—Stuart D. Frenkel

[57] ABSTRACT

A carrier particle for electrostatographic developer mixtures comprising a core having an average diameter between 30 and 1,000 microns surrounded by an outer layer of polymeric vinyl pyridine and an organo silane, silanol or siloxane having from 1 to 3 hydrolyzable groups and an organic group attached directly to a silicon atom containing an unsaturated carbon-to-carbon linkage. The carrier particle is used with small finely-divided toner particles to develop electrostatic latent images.

12 Claims, No Drawings

CARRIER BEAD COATING COMPOSITIONS

BACKGROUND OF THE INVENTION

This invention relates, in general, to electrostatographic imaging systems, and, in particular, to improved developer materials and their uses.

The formation and development of images on the surface of photoconductive materials by electrostatic means is well-known. The basic electrophotographic process, as taught by C. F. Carlson in U.S. Pat. No. 2,297,691, involves placing a uniform electrostatic charge on a photoconductive insulating layer, exposing the layer to a light and shadow image to dissipate the charge on the areas of the layer exposed to the light and developing the resulting electrostatic latent image by depositing on the image a finely-divided electroscopic material referred to in the art as "toner". The toner will normally be attracted to those areas of the layer which retain a charge thereby forming a toner image corresponding to the electrostatic latent image. This powder image may then be transferred to a support surface such as paper. The transferred image may subsequently be permanently affixed to the support surface as by heat. Instead of latent image formation by uniformly charging the photoconductive layer and then exposing the layer to a light and shadow image, one may form the latent image by directly charging the layer in image configuration. The powder image may be fixed to the photoconductive layer if elimination of the powder image transfer step is desired. Other suitable fixing means such as solvent or overcoating treatment may be substituted for the foregoing heat fixing step.

Many methods are known for applying the electroscopic particles to the electrostatic latent image to be developed. One development method, as disclosed by E. N. Wise in U.S. Pat. No. 2,618,552 is well-known as "cascade" development. In this method, a developer material comprising relatively large carrier particles having finely-divided toner particles electrostatically clinging to the surface of the carrier particles is conveyed to and rolled or cascaded across the electrostatic latent image bearing surface. The composition of the toner particles is so chosen as to have a triboelectric polarity opposite that of the carrier particles. As the mixture cascades or rolls across the image bearing surface, the toner particles are electrostatically deposited and secured to the charged portion of the latent image and are not deposited on the uncharged or background portions of the image. Most of the toner particles accidentially deposited in the background are removed by the rolling carrier, due apparently, to the greater electrostatic attraction between the toner and the carrier than between the toner and the discharged background. The carrier particles and unused toner particles are then recycled. The technique is extremely good for the development of line copy images. The cascade development process is the most widely used commercial electrostatographic development technique. A general purpose office copying machine incorporating this technique is described in U.S. Pat. No. 3,099,943.

Another technique for developing electrostatic latent images is the "magnetic brush" process as disclosed, for example, in U.S. Pat. No. 2,874,063. In this method, a developer material containing toner and magnetic carrier particles is carried by a magnet. The magnetic field of the magnet causes alignment of the magnetic carriers in a brush-like configuration. This "magnetic brush" is engaged with an electrostatic latent image bearing surface and the toner particles are drawn from the brush to the electrostatic latent image by electrostatic attraction.

Another technique for developing electrostatic latent images is the "touchdown" process as disclosed, for example, in U.S. Pat. Nos. 2,895,847 and 3,245,823 to Mayo. In this method, a developer material is carried to a latent image bearing surface by a support layer such as a web or sheet and is deposited thereon in conformity with said image.

Carrier particles are made from or coated with materials having appropriate triboelectric properties as well as certain other physical characteristics. Thus, the materials employed as the carrier particles or the coatings thereon should have a triboelectric value commensurate with the triboelectric value of the toner to enable electrostatic adhesion of the toner to the carrier particles and subsequent transfer of the toner from the carrier particles to the image on the plate without excessive power requirements. Furthermore, the triboelectric properties of all the carrier particles should be relatively uniform to permit uniform pick-up and subsequent deposition of toner. The materials employed in the carrier particles should have an intermediate hardness so as not to scratch the plate or drum surface upon which the electrostatic image is initially placed while being sufficiently hard to withstand the forces to which they are subjected during recycle. The carrier particles as well as the surface thereof also should not be comprised of materials which are so brittle as to cause either flaking of the surface or particle break-up under the forces exerted on the particles during recycle. The flaking causes undesirable effects in that the relatively small flaked particles will eventually be transferred to the copy surface thereby interfering with the deposited toner and causing imperfections in the copy image. Furthermore, flaking of the carrier particle surface will cause the resultant carrier particles to have non-uniform triboelectric properties when the carrier particle is composed of a core material different from the surface coating thereon. This results in undesirable non-uniform pick-up of toner by the carrier particles and non-uniform deposition of toner on the image. In addition, when the carrier particle size is reduced, the removal of the resultant small particles from the plate becomes increasingly difficult. Thus, the type of materials useful for making carrier particles or for coating carrier particles, although having the appropriate triboelectric properties, are limited because other physical properties which they possess may cause the undesirable results discussed above.

It is highly desirable to alter triboelectric properties of the carrier cores to accommodate the use of desirable toner compositions while retaining the other desirable physical characteristics of the carrier particle. The alteration of the triboelectric properties of carrier particles by applying a surface coating thereon is a particularly desirable technique. With this technique, not only is it possible to alter the triboelectric properties of carrier particles made from materials having desirable physical characteristics, it is also possible to employ materials previously not suitable as carrier particles. Thus, for example, carrier particles having desirable physical properties with the exception of hardness, can be coated with a material having desirable hardness as well as other physical properties, rendering the resultant product useful as carrier particles.

While ordinarily capable of producing good quality images, conventional developing materials suffer serious deficiencies in certain areas. The developing materials must flow freely to facilitate accurate metering and even distribution during the development and developer recycling phases of the electrostatographic process. Some developer materials, though possessing desirable properties such as proper triboelectric characteristics, are unsuitable because they tend to cake, bridge and agglomerate during handling and storage. Adherence of carrier particles to reusable electrostatographic imaging surfaces causes the formation of undesirable scratches on the surfaces during image transfer and surface cleaning steps. The tendency of carrier particles to adhere to imaging surfaces is aggravated when the carrier surfaces are rough and irregular. The coatings of most carrier particles deteriorate rapidly when employed in continuous processes which require the recycling of carrier particles by bucket conveyors partially submerged in the developer supply such as disclosed in U.S. Pat. No. 3,099,943. Deterioration occurs when portions of or the entire coating separates from the carrier core. The separation may be in the form of chips, flakes or entire layers and is primarily caused by fragile, poorly adhering coating materials which fail upon impact and abrasive contact with machine parts and other carrier particles. Carriers having coatings which tend to chip and otherwise separate from the carrier core must be frequently replaced thereby increasing expense and loss of productive time. Print deletion and poor print quality occur when carrier particles having damaged coatings are not replaced. Fines and grit formed from carrier disintegration tend to drift and form undesirable and damaging deposits on critical machine parts. Many carrier coatings having high compressive and tensile strength either do not adhere well to the carrier core or do not possess the desired triboelectric characteristics. The triboelectric and flow characteristics of many carriers are adversely affected when relative humidity is high. For example, the triboelectric values of some carrier coatings fluctuate with changes in relative humidity and are not desirable for employment in electrostatographic systems, particularly in automatic machines which require carriers having stable and predictable triboelectric values. Another factor affecting the stability of carrier triboelectric properties is the susceptibility of carrier coatings to "toner impaction". When carrier particles are employed in automatic machines and recycled through many cycles, the many collisions which occur between the carrier particles and other surfaces in the machine cause the toner particles carried on the surface of the carrier particles to be welded or otherwise forced into the carrier coatings. The gradual accumulation of permanently attached toner material on the surface of the carrier particles causes a change in the triboelectric value of the carrier particles and directly contributes to the degradation of copy quality by eventual destruction of the toner carrying capacity of the carrier. Thus, there is a continuing need for a better developer material for developing electrostatic latent images.

It is therefore an object of this invention to provide developers which overcome the above-noted deficiencies and are suitable for use in electrostatographic reproduction processes.

It is another object of this invention to provide carrier particles which possess improved electrostatic and physical properties for efficient and prolonged use in electrostatographic reproduction processes.

It is a further object of this invention to provide carrier particles having a hard and tough coating which tenaciously adheres to the carrier core whereby the carrier particles are more resistant to toner impaction, chipping and flaking.

It is another object of this invention to provide developing materials which flow more freely.

It is yet another object of this invention to provide carrier coatings having more stable triboelectric values.

It is a further object of this invention to provide carrier coatings having higher tensile and compressive strength.

It is yet another object of this invention to provide carrier coatings having greater resistance to disintegration.

It is yet another object of this invention to provide coated carrier materials having greately increased developer life.

It is another object of this invention to provide developers having physical and chemical properties superior to those of known developer materials.

The above objects and others are accomplished, generally speaking, by providing a carrier for electrostatographic developer mixtures comprising finely-divided toner particles electrostatically clinging to the surface of carrier particles wherein said carrier particles comprise a core having an outer layer thereon of vinyl pyridine and organo silicon carrier coating materials having improved properties. In general, the carrier coating materials of this invention comprise a copolymer of a vinyl pyridine and an organosilicon compound, or a terpolymer of a vinyl pyridine, an organosilicon, and a second vinyl monomer.

In accordance with this invention, it has been found that the carrier coating materials of this invention provide electrostatographic coated carrier materials which possess desirable triboelectric charging properties, that is, generate high triboelectric charging values, and also possess elastic or viscoelastic properties as to avoid or minimize mechanical degradation of carrier particles coated therewith. It has been generally believed that failure of toner and coated carrier developer mixtures in electrostatographic reproduction devices is at least partially attributed to toner impaction, and partially to carrier coating material degradation thought to be aggravated by the high mechanical stress levels created in the machine configuration from carrier-to-carrier, and carrier-to-housing impacts. The degradation of the carrier coating materials results in coating depletion via polymer substrate adhesive failure or polymer failure resulting in undesirably altered carrier coating triboelectric charging characteristics.

It has now been found that the properties desired of carrier coating materials may be attained by employing polymers of a vinyl pyridine and an organosilicon. The vinyl pyridine is the component of the polymeric mixtures that provides desirable triboelectric charging properties to the carrier coating materials, while the organosilicon and the second vinyl monomer provide the carrier coating materials with tensile strength, tear strength, and abrasion resistance.

Any suitable vinyl pyridine may be employed as a component of the carrier coating materials of this invention. Typical vinyl pyridines include 2-vinyl pyridine, 4-vinylpyridine, 2-vinyl piperidine, and any substituted monomer of vinyl pyridine, vinyl piperidine, and vinyl quinoline.

Any suitable organosilicon may be employed as a component of the carrier coating materials of this invention. Typical organosilicons include monomers or prepolymers of organo silanes, silanols or siloxanes having from 1 to 3 hydrolyzable groups and an organic group attached directly to the silicon atom containing an unsaturated carbon-to-carbon linkage capable of addition polymerization.

The unsaturated organic group attached to a silicon atom contains the unsaturation is a non-benzoid group and is preferably an unsaturated hydrocarbon group or derivatives thereof. Typical unsaturated organic groups include: vinyl, chlorovinyl, divinyl, styryl, distyryl, allyl, diallyl, triallyl, allylphenyl, dimethallyl and methacryloxypropyl groups and derivatives thereof. Typical hydrolyzable groups include: ethoxy, methoxy, chloro, bromo, propyloxy, acetoxy, and amino groups. Examples of typical unsaturated organo silanes having hydrolyzable groups attached to a silicon atom include: vinyltriethoxy silane, vinyltrimethoxy silane, divinyl dichloro silane, and dimethylvinylchloro silane. Suitable corresponding polymerizable hydrolysis products and the corresponding siloxanes may be substituted for the foregoing unsaturated organo silanes. If more than one organic group is attached to a silicon atom, only one of the organic groups need be unsaturated to enter into a polymerization reaction with other unsaturated monomers. Hence, compounds such as dimethyl vinyl chlorosilane are suitable. When more than one unsaturated group attached to the silicon atom is present, these unsaturated groups need not be identical. For example, vinyl allyl silicon chlorides and bromides may be employed. Partially condensed siloxanes in the liquid state having reactive unsaturated organic groups attached to a silicon atom may be employed as a component of the polymers of this invention.

Any suitable second vinyl monomer may be employed as a third component of the carrier coating materials of this invention. Typical suitable second vinly monomers include free monomers or prepolymers with which the above organo silicone compounds are particularly adapted to react to form the improved carrier coatings of this invention include the unsaturated compounds which normally form resinous polymers by addition type polymerization. Monomers or prepolymers containing the unsaturation in a non-benzoid group may be employed, such unsaturated monomers or prepolymers include those having an ethylenic or acetylenic linkage. Thus, there are included olefins, diolefins, acetylenes and their derivatives, particularly derivatives having substituents such as halogen, alkyl, aryl, unsaturated alicyclic and other types of substituent groups including, for example, nitrile or nitro groups. The unsaturated organic monomers containing the unsaturation in a non-benzoid group also include unsaturated hydrocarbons, aliphatic, carbocyclic, and heterocyclic compounds, including unsaturated alcohols, aldehydes, ketones, quinones, acids, acid anhydrides, esters, nitriles or nitro compounds. Typical unsaturated monomers include: ethylene, propylene, butenes, isobutylene, pentenes, hexenes, methyl methacrylate, methyl acrylate, vinyl chloride, vinylidene chloride, acrylonitrile, chlorovinyl acetate, styrene, butadiene, chloroprene, cyclopentadiene, divinylbenzene, cyclohexadiene, ethyl methacrylate, vinyl acetate, vinyl toluene, acetylene, phenylacetylene, ethylvinyl benzene, allyl chloride, allyl benzene, maleic anhydride, ethyl acrylate, diethylmaleate, butyl acrylate, butyl methacrylate, isobutyl methacrylate, methacrylic anhydride, vinyl formate, and mixture thereof.

The polymerizable unsaturated monomers or prepolymers of this invention are mixed with any free-radical initiator or catalyst capable of polymerizing the monomers or prepolymers. By a "free-radical initiator or catalyst" is meant a compound which is capable of producing free-radicals under the polymerization conditions employed, such as compounds having an —O—O— or an —N=N— linkage. Examples of the more commonly employed free-radical initiators or catalysts include: alkyl peroxides, such as tert-butyl hydroperoxide, and di-tertbutyl peroxide: acyl and aroyl peroxides, such as dibenzoyl peroxide, perbenzoic acid, dilauroyl peroxide, perlauric acid and acetyl benzoyl peroxide, azo compounds, such as azo-bis-isobutyro nitrile, dimethylazodiisobutyrate, azo-bis-1-phenylethane and alkali metal azo-disulfonates, and the like. In general, the free-radical initiators or catalysts are employed in an amount from about 0.0001 to about 5.0 percent based on the combined weight of the polymerizable ingredients.

The polymerization temperature to be employed is generally dependent on the batch size, the amount of catalyst present, the molecular weight to be attained, and the activation energy of the polymerization reaction. The rate of polymerization increases with an increase in temperature. Because greater exothermic reactions occur at high temperatures and increase the danger of uncontrollable reactions, high temperatures are preferably employed in processes where the heat of polymerization may be removed under controlled conditions, e.g. in jacketed tubes through which the polymerizable or partially polymerized material is continuously passed and in stirred kettles. The polymerization temperature employed is usually within the range of about 60° C to about the reflux temperatures of the monomer mixture at atmospheric pressure. However, economy and operating conditions such as the use of pressure or a vacuum may determine the use of higher or lower temperatures. Polymerization may be effectuated by suitable methods such as by bulk or solvent polymerization techniques. If a solvent is employed, it can be any suitable true organic solvent, i.e., a liquid unreactive to the system but capable of dissolving the reactive components. Typical well known solvents include the chlorinated, hydrocarbon solvents such as, for example, chloroform, and 1,1,1-trichloroethylene, and also xylene, benzene, toluene, hexane, cyclopentane, ethyl acetate, methyl ethyl ketone, and the like. When the weight average molecular weight of the polymer or prepolymer is sufficient, as controlled by the reaction conditions including time, temperature, catalyst and type of monomer, the polymer or prepolymer may, if necessary, be dissolved in any suitable solvent and applied by conventional coating methods, e.g., spraying, dipping, or fluidized bed coating. Typical solvents for the polymers include the solvents described immediately above.

Excellent results are obtained with a carrier coating containing the solid polymeric reaction product of monomers or prepolymers of vinyl pyridine and organo-silanes, silanols or siloxanes having from 1 to 3 hydrolyzable groups and an organic group attached directly to the silicon atom containing an unsaturated carbon-to-carbon linkage capable of addition polymerization; and terpolymers of the aforementioned with a second vinyl monomer such as styrene or acrylate and methacrylate esters. The polymeric carrier coating materials of this invention may comprise random, block or graft copolymers, terpolymers and high mixed polymer systems.

In accordance with this invention, satisfactory electrostatographic carrier coating compositions are provided when the materials comprise from between about 50 and about 98 parts by weight of vinyl pyridine and from between about 2 and about 50 parts by weight of the organosilicon. However, it is preferred that the electrostatographic carrier coating compositions of this invention comprise from between about 85 and about 98 parts by weight of vinyl pyridine and from between about 2 and about 15 parts by weight of the organosilicon because owing to the sensitivity to moisture of vinyl pyridine, the triboelectric properties of the carrier coating compositions are more stable under various relative humidity conditions and yield high triboelectric charging values.

Optimum results are generally obtained when the electrostatographic carrier coating compositions of this invention comprise from between about 95 and about 98 parts by weight of vinyl pyridine and from between about 2 and about 5 parts by weight of the organosilicon. In addition, terpolymers of vinyl pyridine, organosilicon, and a second vinyl monomer may be employed to obtain the electrostatographic carrier coating compositions of this invention and such terpolymers are considered within the scope of this invention. When a second vinyl monomer is employed in the coating compositions of this invention, it may be present in an amount of from between about 5 and about 25 parts by weight based on the total parts of the coating composition.

Any suitable coating thickness may be employed. However, a coating having a thickness at least sufficient to form a continuous film is preferred because the carrier coating will then possess sufficient thickness to resist abrasion and prevent pinholes which adversely affect the triboelectric properties of the coated carrier particles. Generally, for cascade and magnetic brush development, the carrier coating may comprise from about 0.1 percent to about 2.0 percent by weight based on the weight of the coated carrier particle. Preferably, the coating should comprise from about 0.2 percent to about 0.9 percent by weight based on the weight of the coated particle because maximum coating durability, toner impaction resistance, and copy quality are achieved. If a partially polymerized linear or cross-linked prepolymer is to be used as the coating material, polymerization is completed in situ on the surface of the carrier by further application of heat. To achieve further variation in the properties of the final resinous product, well known additives such as plasticizers, reactive or non-reactive resins, dyes, pigments, wetting agents and mixtures thereof may be mixed with the resin. Hydrolysis of the hydrolyzable groups attached to the silicon atoms may be promoted by pretreating the carrier core with any suitable hydrolyzing medium such as a dilute solution of acetic acid or sodium hydroxide, or by mixing the hydrolyzing material with the polymer prior to the coating operation.

Any suitable well-known coated or uncoated carrier material may be employed as the substrate for the carriers of this invention. Typical carrier core materials include sodium chloride, ammonium chloride, aluminum potassium chloride, Rochelle salt, sodium nitrate, potassium chlorate, granular zircon, granular silicon, methyl methacrylate, glass, silicon dioxide, flintshot, iron, steel, ferrite, nickel carborundum and mixtures thereof. Typical carrier substrates for "touchdown" donor surfaces include cloth, metal-backed paper, cellophane, aluminum foil, resins such as polyethylene terephthalate and polyvinyl resins, cellulosic derivatives, protein materials, and combinations thereof. Many of the foregoing and other typical carrier materials are described by L. E. Walkup in U.S. Pat. No. 2,618,551; L. E. Walkup et al. in U.S. Pat. No. 2,638,416; E. N. Wise in U.S. Pat. No. 2,618,552; and C. R. Mayo in U.S. Pat. Nos. 2,805,847 and 3,245,823. An ultimate coated carrier particle having an average diameter between about 30 microns to about 1,000 microns is preferred because the carrier particle then possesses sufficient density and inertia to avoid adherence to the electrostatic images during the development process. Adherence of carrier beads to an electrostatographic drum is undesirable because of the formation of deep scratches on the drum surface during the image transfer and drum cleaning steps, particularly where cleaning is accomplished by a web cleaner such as the web disclosed by W. P. Graff, Jr. et al. in U.S. Pat. No. 3,186,838.

Any suitable finely-divided toner material may be employed with the coated carriers of this invention. Typical toner materials include gum copal, gum sandarac, rosin, cumaroneindene resin, asphaltum, gilsonite, phenolformaldehyde resins, rosin modified phenolformaldehyde resins, methacrylic resins, polystyrene resins, epoxy resins, polyester resins, polyethylene resins and mixtures thereof. The particular toner material to be employed obviously depends upon the separation of the toner particles from the coated carrier beads in the triboelectric series. Among the patents describing electroscopic toner compositions are U.S. Pat. No. 2,659,670 to Copley; U.S. Pat. No. 2,753,308 to Landrigan; U.S. Pat. No. 3,079,342 to Insalaco; U.S. Pat. No. Re. 25,136 to Carlson and U.S. Pat. No. 2,788,288 to Rheinfrank et al. These toners generally have an average particle diameter between about 1 and about 30 microns.

Any suitable pigment or dye may be employed as the colorant for the toner particles. Toner colorants are well known and include, for example, carbon black, nigrosine dye, aniline blue, Calco Oil Blue, chrome yellow, ultra marine blue, Quinoline Yellow, methylene blue chloride, Monastral Blue, Malachite Green Oxalate, lampblack, Rose Bengal, Monastral Red, Sudan Black BN, and mixtures thereof. The pigment or dye should be present in the toner in a sufficient quantity to render it highly colored so that it will form a clearly visible image on a recording member.

Any suitable conventional toner concentration may be employed with the coated carriers of this invention. Typical toner concentrations include about 1 part toner with about 10 to 200 parts by weight of carrier.

Any suitable well-known electrophotosensitive material may be employed as the photoreceptor with the coated carriers of this invention. Well-known photoconductive materials include vitreous selenium, organic or inorganic photoconductors embedded in a non-photoconductive matrix, organic or inorganic photoconductors embedded in a photoconductive matrix, or the like. Representative patents in which photoconductive materials are disclosed include U.S. Pat. No. 2,803,542 to Ullrich, U.S. Pat. No. 2,970,906 to Bixby, U.S. Pat. No. 3,121,006 to Middleton, U.S. Pat. No. 3,121,007 to Middleton, and U.S. Pat. No. 3,151,982 to Corrsin.

The surprisingly better results obtained with the carrier coating materials of this invention may be due to many factors. For example, the marked durability of the coating materials may be due to the fact that these resins provide improved abrasion resistance with the substrates. Greatly improved adhesion over conventional coating materials is obtained when the coating materials of this invention are applied to glass, steel or similar metallic paticles. Coatings prepared from the polymer blends of this invention possess smooth outer surfaces which are highly resistant to cracking, chipping, and flaking. The smooth tough surface enhances the rolling action of the carrier particles across the electrostatographic surfaces and reduces the tendency of the carrier particles to adhere to the electrostatographic surfaces. The carrier coatings are easily prepared and exhibit improved stability during extended periods of usage. The carrier coatings employed in the present invention are non-tacky and have sufficient hardness at normal operating temperatures to prevent impaction; form strong adhesive coatings which do not flake under normal operating conditions; and have triboelectric values such that they can be used with a wide variety of presently available toners in present electrostatographic processes. Thus, the coated carrier particles of this invention have desirable properties which permit their wide use in presently available electrostatographic processes.

The carrier coating materials of this invention are further characterized as having excellent durability due to their mechanical properties and are especially desirable when employed in continuous electrostatographic development processes which require the recycling of carrier particles by bucket conveyors partially submerged in the developer material supply. Further, these resins have good heat and chemical resistance which is also desirable when employed as carrier coatings in the presence of various conventional electroscopic toner materials and at the conditions encountered in electrostatographic machines.

DESCRIPTION OF PREFERRED EMBODIMENTS

The following examples, other than the control examples, further define, describe and compare preferred methods of utilizing the carrier materials of the present invention in electrostatographic applications. Parts and percentages are by weight unless otherwise indicated.

EXAMPLE I

A control developer mixture is prepared by applying a coating solution containing about 15 percent by weight of styrene, about 80 percent by weight of methyl methacrylate, and about 5 percent by weight of vinyl triethoxy silane dissolved in toluene to 100 micron steel carrier cores. The carrier cores and the coating solution are simultaneously heated and suspended in a vibrating drum. The coating solution is applied to provide about 0.6 percent by weight of the terpolymer coating based on the weight of the coated cores. After removal of the solvent and drying the coated cores, the coated cores are mixed with a toner material comprising a copolymer of styrene and alkyl methacrylate containing a carbon black wherein the toner material has an average particle size of between 10 and 15 microns. The coated cores are blended with the toner material in an amount of about 1 part toner material per about 100 parts of carrier material. The developer mixture is used to develop a photoconductive surface bearing an electrostatic latent image. It is found that the developer mixture produces image background levels considerably above the maximum value of 0.010 deemed acceptable as measured by a standard reference scale. An examination of the developer mix after test termination reveals numerous carrier chips or flakes in the developer mix.

EXAMPLE II

A developer mixture is prepared by applying a coating solution containing a copolymer of about 90 percent by weight of 2-vinyl pyridine and about 10 percent by weight of gammamethacryloxypropyltrimethoxy silane dissolved in chloroform to 100 micron steel carrier cores. The carrier cores and the coating solution are simultaneously heated and suspended in a vibrating drum. The coating solution is applied to provide about 0.6 percent by weight of the coating material based on the weight of the coated cores. After removal of the solvent and drying the coated cores, the coated cores are mixed with the toner material of Example I in the same proportion. The developer mixture is used to develop a photoconductive surface bearing an electrostatic latent image. It is found that the developer mixture produces images of excellent quality with satisfactory background levels well below the maximum value of 0.010 deemed acceptable. An examination of the developer mix after test termination reveals relatively few carrier coating chips or flakes.

EXAMPLE III

A developer mixture is prepared by applying a coating solution containing a copolymer of about 95 percent by weight of 2-vinyl pyridine and about 5 percent by weight of gammamethacryloxypropyltrimethoxy silane dissolved in chloroform to 100 micron steel carrier cores. The carrier cores and the coating solution are simultaneously heated and suspended in a vibrating drum. The coating solution is applied to provide about 0.6 percent by weight of the coating material based on the weight of the coated cores. After removal of the solvent and drying the coated cores, the coated cores are mixed with the toner material of Example I in the same proportion. The developer mixture is used to develop a photoconductive surface bearing an electrostatic latent image. It is found that the developer mixture produces images of excellent quality with satisfactory background levels well below the maximul value of 0.010 deemed acceptable. An examination of the developer mix after test termination reveals relatively few carrier coating chips or flakes.

EXAMPLE IV

A developer mixture is prepared by applying a coating solution containing a copolymer of about 95 percent by weight of 4-vinyl pyridine and about 5 percent by weight of gammamethacryloxypropyltrimethoxy silane dissolved in chloroform to 100 micron steel carrier cores. The carrier cores and the coating solution are siultaneously heated and suspended in a vibrating drum. The coating solution is applied to provide about 0.6 percent by weight of the coating material based on the weight of the coated cores. After removal of the solvent and drying the coated cores, the coated cores are mixed with the toner material of Example I in the same proportion. The developer mixture is used to develop a photoconductive surface bearing an electrostatic latent image. It is found that the developer mixture produces images of excellent quality with satisfactory background levels well below the maximum value of 0.010 deemed acceptable. An examination of the developer mix after test termination reveals relatively few carrier coating chips or flakes.

EXAMPLE V

A developer mixture is prepared by applying a coating solution containing a copolymer of about 90 percent by weight of 4-vinyl pyridine and about 10 percent of gammamethacryloxypropyltrimethoxy silane dissolved in chloroform to 100 micron ferrite carrier cores. The carrier cores and the coating solution are simultaneously heated and suspended in a vibrating drum. The coating solution is applied to provide about 0.6 percent by weight of the coating material based on the weight of the coated cores. After removal of the solvent and drying the coated cores, the coated cores are mixed with the toner material of Example I in the same proportion. The developer mixture is used to develop a photoconductive surface bearing an electrostatic latent image. It is found that the developer mixture produces images of excellent quality with satisfactory background levels well below the maximum value of 0.010 deemed acceptable. An examination of the developer mix after test termination reveals relatively few carrier coating chips or flakes.

Although specific materials and conditions were set forth in the above exemplary processes in making and using the developer material of this invention, these are merely intended as illustrations of the present invention. Various other toners, carrier cores, substituents and processes such as those listed above may be substituted for those in the examples with similar results.

Other modifications of the present invention will occur to those skilled in the art upon a reading of the present disclosure. These are intended to be included with the scope of this invention.

What is claimed is:

1. A carrier particle for electrostatographic developer mixtures comprising a core having an average diameter of from between about 30 microns and about 1,000 microns surrounded by a thin outer layer, said outer layer comprising a copolymer of vinyl pyridine and organosilicon wherein said organosilicon is selected from the group consisting of organosilanes, silanols and siloxanes having from 1 to 3 hydrolyzable groups and an organic group attached directly to a silicon atom containing an unsaturated carbon-to-carbon linkage.

2. A carrier particle for electrostatographic developer mixtures in accordance with claim 1 wherein said vinyl pyridine is selected from the group consisting of 2-vinyl pyridine, 4-vinyl pyridine, and 5-vinyl-2-methyl pyridine.

3. A carrier particle for electrostatographic developer mixtures in accordance with claim 1 wherein said organosilicon is gamma-methacryloxypropyltrimethoxy silane.

4. A carrier particle for electrostatographic developer mixtures in accordance with claim 1 wherein said copolymer is a terpolymer including a second vinyl monomer.

5. A carrier particle for electrostatographic developer mixtures in accordance with claim 4 wherein said second vinyl monomer is selected from the group consisting of styrene, alkyl acrylates, alkyl methacrylates, and esters thereof.

6. A carrier particle for electrostatographic developer mixtures in accordance with claim 4 wherein said second vinyl monomer is present in an amount of from between about 5 and about 25 parts by weight based on the weight of said terpolymer.

7. A carrier particle for electrostatographic developer mixtures in accordance with claim 1 wherein said copolymer comprises from between about 50 and about 98 parts by weight of said vinyl pyridine and from between about 2 and about 50 parts by weight of said organosilicon based on the weight of said copolymer.

8. A carrier particle for electrostatographic developer mixtures in accordance with claim 1 wherein said copolymer comprises from between about 85 and about 98 parts by weight of said vinyl pyridine and from between about 2 and about 15 parts by weight of said organosilicon based on the weight of said copolymer.

9. A carrier particle for electrostatographic developer mixtures in accordance with claim 1 wherein said copolymer comprises from between about 95 and about 98 parts by weight of said vinyl pyridine and from between about 2 and about 5 parts by weight of said organosilicon based on the weight of said copolymer.

10. A carrier particle for electrostatographic developer mixtures in accordance with claim 1 wherein said outer layer comprises from about 0.1 to about 2.0 percent by weight based on the weight of said carrier particle.

11. An electrostatographic developer mixture comprising finely-divided toner particles electrostatically clinging to the surface of carrier particles, said carrier particles comprising a core having an average diameter of from between about 30 microns and about 1,000 microns surrounded by a thin outer layer, said outer layer comprising a copolymer of vinyl pyridine and organosilicon wherein said organosilicon is selected from the group consisting of organosilanes, silanols and siloxanes having from 1 to 3 hydrolyzable groups and an organic group attached directly to a silicon atom containing an unsaturated carbon-to-carbon linkage.

12. An electrostatographic imaging process comprising the steps of providing an electrostatographic imaging member having a recording surface, forming an electrostatic latent image on said recording surface, and contacting said electrostatic latent image with a developer mixture comprising finely-divided toner particles electrostatically clinging to the surface of carrier particles, said carrier particles comprising a core having an average diameter of from between about 30 microns and about 1,000 microns surrounded by a thin outer layer, said outer layer comprising a copolymer of vinyl pyridine and organosilicon wherein said organosilicon is selected from the group consisting of organosilanes, silanols and siloxanes having from 1 to 3 hydrolyzable groups and an organic group attached directly to a silicon atom containing an unsaturated carbon-to-carbon linkage, whereby at least a portion of said finely-divided toner particles are attracted to and deposited on said recording surface in conformance with said electrostatic latent image.

* * * * *